United States Patent
Yu et al.

(10) Patent No.: US 9,535,479 B2
(45) Date of Patent: Jan. 3, 2017

(54) METHOD OF PERFORMING POWER MANAGEMENT IN RACK-MOUNT SYSTEM

(71) Applicant: Wistron Corporation, New Taipei (TW)

(72) Inventors: Pei-Ling Yu, New Taipei (TW); Sheng-Kai Lai, New Taipei (TW); Bing-Kun Syu, New Taipei (TW); Jui-Jen Su, New Taipei (TW); Hu-Hsi Li, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/811,857

(22) Filed: Jul. 29, 2015

(65) Prior Publication Data

US 2016/0259384 A1 Sep. 8, 2016

(30) Foreign Application Priority Data

Mar. 2, 2015 (TW) .............................. 104106543 A

(51) Int. Cl.
*G06F 1/26* (2006.01)
*G06F 1/32* (2006.01)
*G06F 9/44* (2006.01)
*G06F 11/14* (2006.01)
*G06F 1/18* (2006.01)

(52) U.S. Cl.
CPC ............... *G06F 1/26* (2013.01); *G06F 9/4401* (2013.01); *G06F 1/188* (2013.01); *G06F 1/189* (2013.01); *G06F 1/3206* (2013.01); *G06F 11/1417* (2013.01)

(58) Field of Classification Search
CPC .......... G06F 1/26; G06F 1/3206; G06F 1/189; G06F 11/3062; G06F 1/188; G06F 11/1417
USPC ......................................... 713/300, 320, 330
See application file for complete search history.

(56) References Cited

U.S. PATENT DOCUMENTS

| 2014/0281614 A1 | 9/2014 | Mick | |
|---|---|---|---|
| 2015/0121113 A1* | 4/2015 | Ramamurthy | H02J 9/061 713/340 |
| 2015/0220134 A1* | 8/2015 | Zhou | G06F 1/189 713/320 |

FOREIGN PATENT DOCUMENTS

| TW | 200506593 | 2/2005 |
|---|---|---|
| TW | 201500902 A | 1/2015 |

OTHER PUBLICATIONS

Office action mailed on Jan. 12, 2016 for the Taiwan application No. 104106543, filing date: Mar. 2, 2015, p. 2 line 4-26, p. 3-6 and p. 7 line 1-4.

\* cited by examiner

*Primary Examiner* — Michael J Brown
(74) *Attorney, Agent, or Firm* — Winston Hsu; Scott Margo

(57) ABSTRACT

A rack-mount system includes a data center manager and a rack which contains a plurality of electronic devices, a rack management controller and a plurality of power supplies. Before a specific electronic device performs a booting procedure, related booting parameters of the specific electronic device are accessed. The data center manager or the rack management controller is configured to calculate the amount of power required for the specific electronic device to perform the booting procedure according to the accessed booting parameters. The rack management controller is configured to control the number of activated power supplies among the plurality of power supplies according to the calculated amount of power.

14 Claims, 6 Drawing Sheets

METHOD OF PERFORMING POWER MANAGEMENT IN RACK-MOUNT SYSTEM

BACKGROUND OF THE INVENTION

1. Field of the Invention

The present invention is related to a method of performing power management in a rack-mount system, and more particularly, to a method of performing power management in a rack-mount system for improving power efficiency.

2. Description of the Prior Art

Computer servers are widely used in enterprises or institutions, especially for network service providers. Among common types of servers, rack-mount servers are advantageous in its compact size and ease of being centrally managed.

In a prior art rack-mount server, the servers installed in the rack do not include any built-in power supply in order to reduce the design complexity and the cost. The power required for operating these servers are centrally provided by a plurality of power supplies in a power supply center disposed in the rack. However, this type of prior art rack-mount server has low power efficiency since the efficiency of each power supply in the power supply center cannot be precisely monitored.

In another prior art rack-mount server, each server installed in the rack includes a built-in power supply, or is provided with a dedicated power supply. The built-in power supply or the dedicated power supply may provide the power required for operating a corresponding server. However, this type of prior art rack-mount server has low power efficiency since the efficiency of each built-in power supply or dedicated power supply cannot be precisely monitored.

SUMMARY OF THE INVENTION

The present invention provides a method of performing power management in a rack-mount system which includes a plurality of electronic devices and a plurality of power supplies disposed in a rack. The method includes accessing booting parameters of a specific electronic device among the plurality of electronic devices before the specific electronic device performs a booting procedure; calculating an amount of power required for the specific electronic device to perform the booting procedure according to the accessed boot parameters; and controlling a number of activated power supplies among the plurality of power supplies according to the calculated amount of power required for the specific electronic device to perform the booting procedure.

The present invention also provides method of performing power management in a rack-mount system which includes a plurality of electronic devices, a plurality of power supplies, an RMC, and at least one non-RMC controlled power supply disposed in a rack. The method includes a specific electronic device among the plurality of electronic devices performs a booting procedure using power supplied by the non-RMC controlled power supply; the RMC monitoring a status of the at least one non-RMC controlled power supply; and the RMC controlling a number of activated power supplies among the plurality of power supplies according to the status of the at least one non-RMC controlled power supply.

The present invention also provides method of performing power management in a rack-mount system which includes a plurality of electronic devices a plurality of power supplies, and an RMC disposed in a rack. The method includes the RMC monitoring an electronic behavior of the rack and an operational status of the plurality of power supplies; and the RMC controlling a number of activated power supplies among the plurality of power supplies according to the monitored electronic behavior and the operational status.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
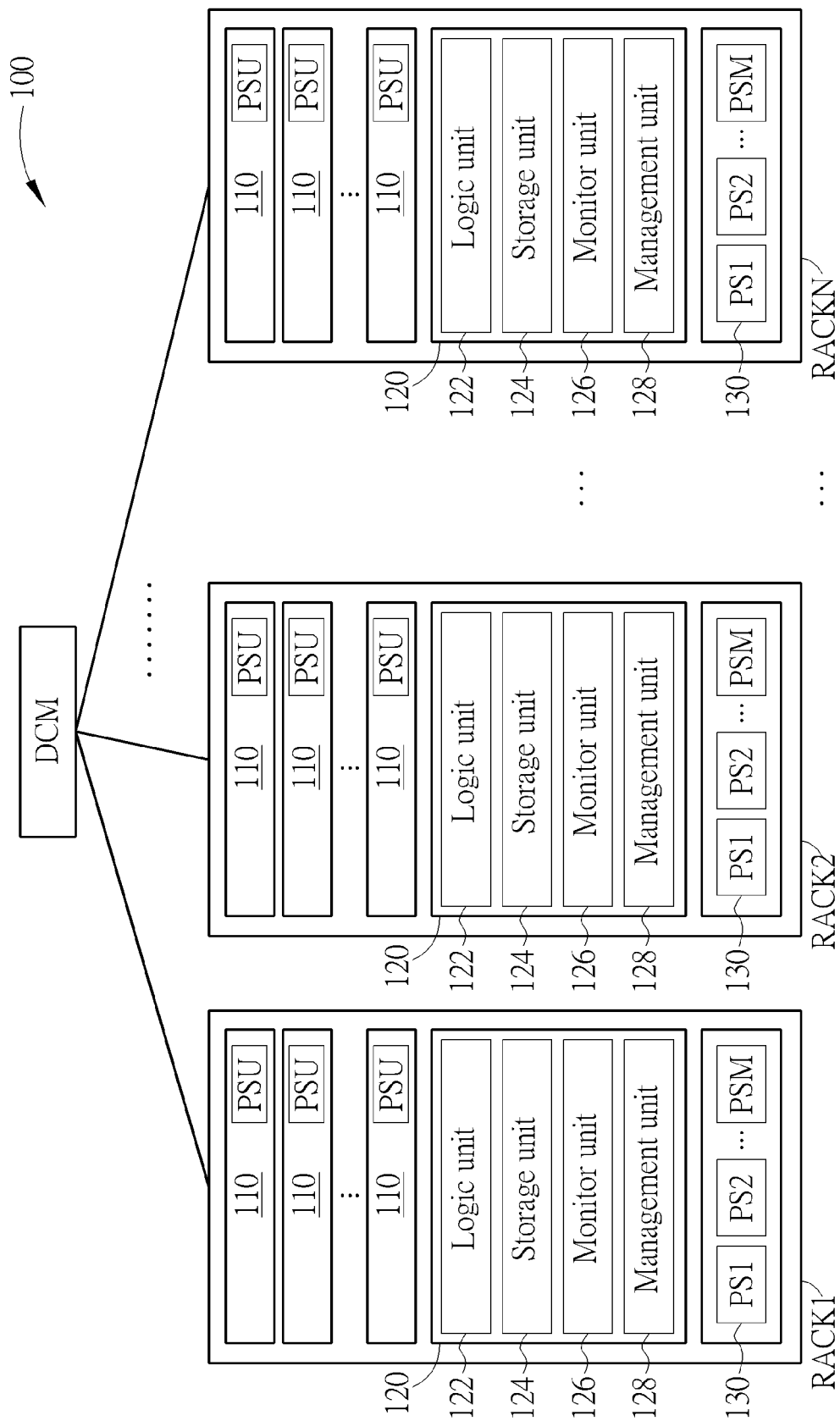
FIG. 1 is a functional diagram of a rack-mount system according to an embodiment of the present application.

FIG. 1 is a functional diagram of a rack-mount system 100 according to an embodiment of the present application. The rack-mount system 100 includes one or multiple racks RACK1-RACKN and a data center manager DCM, wherein N is a positive integer. Each rack includes a plurality of frames and the rack size may be described using a "rack unit" which is commonly referred to as U or RU. The rack size normally ranges from 22U~42U (1U=1.75 inch=44.45 mm). The height of each frame may be adjusted using detachable slides so as to contain electronic devices of various sizes. However, the number and the size of the racks in the rack-mount system 100 do not limit the scope of the present application.

Various types of equipment, such as a plurality of electronic device 110, a rack management controller (RMC) 120, and a power supply center 130, may be disposed inside the racks of the rack-mount system 100. The height of each electronic device 110 is generally a multiple of the rack unit in order to fit in to a suitable rack. The electronic device 110 may include computational servers, storage servers, network device, or other types of information device. In an embodiment, the power required to operate a specific electronic device 110 disposed in a specific rack is provided by a corresponding power supply center 130 which is managed by the RMC 120. In another embodiment, the power required to operate the specific electronic device 110 is provided by a non-RMC controlled power supply PSU. For example, the specific electronic device 110 may include a built-in power supply, or is provided with a dedicated power supply. However, the type and the number of the electronic device 110 do not limit the scope of the present application.

The non-RMC controlled power supply PSU of the specific electronic device 110 is not managed by the RMC, but is instead controlled by the specific electronic device 110.

The non-RMC controlled power supply PSU of each electronic device 110, if any, may provide the same maximum output power or different maximum output power. Even if two non-RMC controlled power supplies PSU are manufactured to provide the same maximum output power, the optimized operational range of the two corresponding electronic devices may be different due to variations in process, material or environment. For example, if the maximum output power of the non-RMC controlled power supply PSU in a first electronic device is 1500 W, the optimized operational range of the first electronic device may be between 500 W and 1200 W; if the maximum output power of the non-RMC controlled power supply PSU in a second electronic device is 1500 W, the optimized operational range of the second electronic device may be between 400 W and 1100 W; if the maximum output power of the non-RMC controlled power supply PSU in a third electronic device is 1000 W, the optimized operational range of the third electronic device may be between 350 W and 800 W. However, the type and the characteristic of the non-RMC controlled power supply PSU in each electronic device do not limit the scope of the present application.

The data center manager DCM is configured to track each monitor item and historical data based on information imported from each node of all racks, thereby performing system level control. The rack management controller 120 in each rack includes a logic unit 122, a storage unit 124, a monitor unit 126, and a management unit 128, and is configured to perform rack level control. The detailed operation of the rack management controller 120 will be described in subsequent paragraphs.

The power supply center 130 in each rack is controlled by a corresponding RMC 120 and includes a plurality of power supplies PS1-PSM (M is a positive integer) for providing the power required to operate each device in the rack.

The power supplies PS1-PSM may provide the same maximum output power or different maximum output power. Even if two power supplies are manufactured to provide the same maximum output power, the optimized operational range of the two power supplies may be different due to variations in process, material or environment. For example, if the maximum output power of the power supply PS1 is 1500 W, the optimized operational range of the power supply PS1 may be between 500 W and 1200 W; if the maximum output power of the power supply PS2 is 1500 W, the optimized operational range of the power supply PS2 may be between 400 W and 1100 W; if the maximum output power of the power supply PS3 is 1000 W, the optimized operational range of the power supply PS3 may be between 350 W and 800 W. However, the type, the number and the characteristic of the power supplies in the power supply center 130 do not limit the scope of the present application. In the present invention, the characteristic of each power supply may be stored in the storage unit 124 of a corresponding RMC 120.

Figure 2:
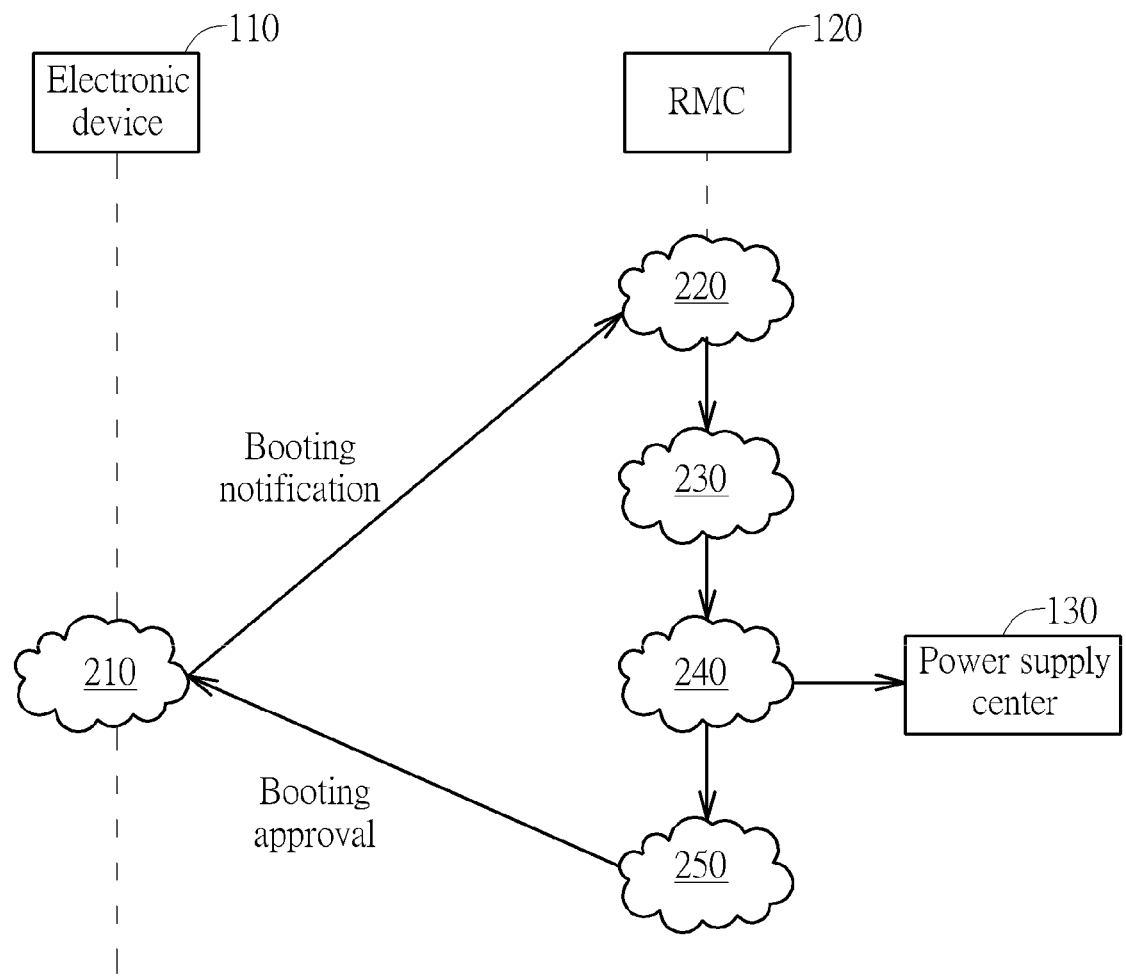
FIG. 2 is a diagram illustrating the operation of a rack-mount system according to an embodiment of the present application.

FIG. 2 is a diagram illustrating the operation of the rack-mount system 100 according to an embodiment of the present application. For illustrative purpose, FIG. 2 depicts the operation of a specific electronic device 110, a specific RMC 120 and a specific power supply center 130 in the rack-mount system 100, and includes the following steps:

Step 210: the specific electronic device 110 sends a booting notification to the specific RMC 120 and performs the booting procedure after receiving a booting approval.

Step 220: the RMC 120 accesses booting parameters of the specific electronic device 110 after receiving a booting notification.

Step 230: the specific RMC 120 calculates the amount of power required for the specific electronic device 110 to perform the booting procedure according to the booting parameters.

Step 240: the specific RMC 120 controls the number of activated power supplies in the specific power supply center 130 according to the amount of power required for the specific electronic device 110 to perform the booting procedure.

Step 250: the specific RMC 120 sends the booting approval to the specific electronic device 110.

In step 210, the specific electronic device 110 may send the booting notification before performing the booting procedure using a specific network communication standard. In an embodiment, the specific electronic device 110 may include a built-in baseboard management controller (BMC) in order to provide an intelligent platform management interface (IPMI) for sending the booting notification. In another embodiment, a network software management module may be installed in the specific electronic device 110 in order to provide a simple network management protocol (SNMP) for sending the booting notification. However, the method of sending the booting notification does not limit the scope of the present invention.

In step 220, the specific RMC 120 may access the booting parameters of the specific electronic device 110 after receiving the booting notification. In step 230, the specific RMC 120 may calculate the amount of power required for the specific electronic device 110 to perform the booting procedure according to the booting parameters. In step 240, the specific RMC 120 may control the number of activated power supplies in the specific power supply center 130 according to the amount of power required for the specific electronic device 110 to perform the booting procedure. More specifically, after receiving the booting notification, the specific RMC 120 may retrieve the maximum power consumption of the specific electronic device 110 from the storage unit 124, calculate the amount of power required for the specific electronic device 110 to perform the booting procedure using the logic unit 122, and control the number of activated power supplies in the specific power supply center 130 using the management unit 128.

Assuming that no built-in power supply or dedicated power supply is available for the specific electronic device 110 and the calculated amount of power in step 230 is 1000 W, the specific RMC 120 is configured to activate one or multiple power supplies in the specific power supply center 130 in step 240 so as to provide power larger than 1000 W. In an embodiment, the specific RMC 120 may activate one or multiple power supplies in the specific power supply center 130, wherein the sum of maximum output power of all activated power supplies is equal to or larger than 1000 W. For example, the specific RMC 120 may activate one power supply with 1000 W maximum output power, two power supplies each with 500 W maximum output power, two power supplies with 700 W maximum output power and 300 W maximum output power, respectively, or four power supplies each with 300 W maximum output power. In another embodiment, the specific RMC 120 may activate one or multiple power supplies in the specific power supply center 130, wherein the sum of output power of all activated power supplies when operating in respective optimized operational range is equal to or larger than 1000 W. For example, the specific RMC 120 may activate one power supply which provides 1000 W output power when operating in its optimized operational range, two power supplies each providing 500 W output power when operating in respective optimized operational ranges, two power supplies which respectively provide 700 W output power and 300 W output power when operating in respective optimized operational ranges, or four power supplies each providing 300 W output power when operating in respective optimized operational ranges. However, the number or combination of activated power supplies does not limit the scope of the present invention.

Assuming that the specific electronic device 110 includes the non-RMC controlled power supply PSU and the calculated amount of power in step 230 is 1000 W, the specific RMC 120 is configured to activate one or multiple power supplies in the specific power supply center 130 so that the specific power supply center 130 and the non-RMC controlled power supply PSU may together provide power larger than 1000 W. In an embodiment, if the non-RMC controlled power supply PSU is able to provide 1000 W output power when operating in its optimized operational range, the specific RMC 120 does not activate any power supply in the specific power supply center 130. In another embodiment, if the non-RMC controlled power supply PSU is fabricated to provide 1000 W maximum output power but can only provide 800 W output power when operating in its optimized operational range, the specific rack management controller 120 may allow the non-RMC controlled power supply PSU of the specific electronic device 110 to operate in its optimized operational range by activating one or multiple power supplies in the specific power supply center 130, wherein the sum of maximum output power of all activated power supplies is equal to or larger than 200 W or the sum of output power of all activated power supplies when operating in respective optimized operational ranges is equal to or larger than 200 W. In yet another embodiment, if the non-RMC controlled power supply PSU of the specific electronic device 110 somehow breaks down, the specific RMC 120 may activate one or multiple power supplies in the specific power supply center 130, wherein the sum of maximum output power of all activated power supplies is equal to or larger than 1000 W or the sum of output power of all activated power supplies when operating in respective optimized operational ranges is equal to or larger than 1000 W. However, the number or combination of activated power supplies does not limit the scope of the present invention.

In step 250, the specific RMC 120 may send the booting approval to notify the specific electronic device 110 of performing the booting sequence.

Figure 3:
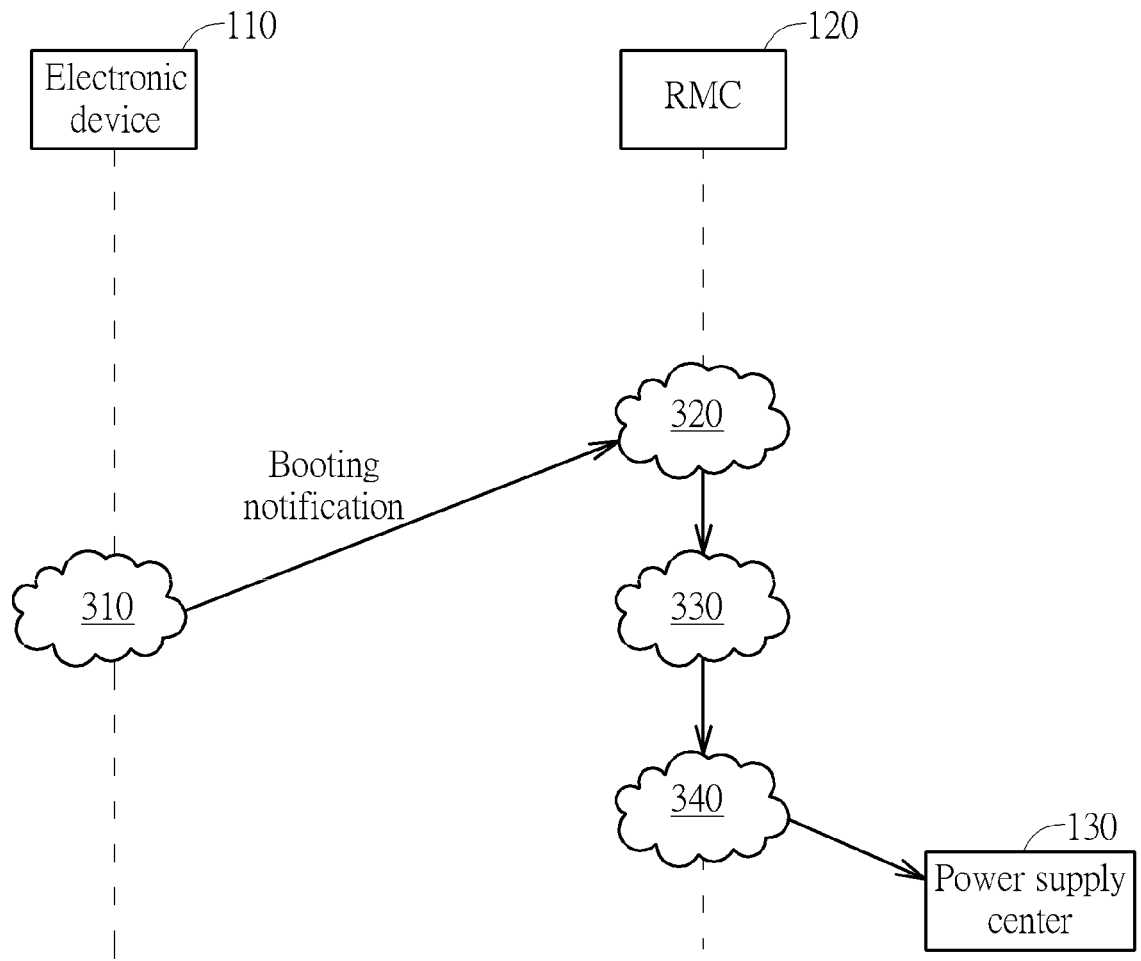
FIG. 3 is a diagram illustrating the operation of a rack-mount system according to another embodiment of the present application.

FIG. 3 is a diagram illustrating the operation of the rack-mount system 100 according to another embodiment of the present application. For illustrative purpose, FIG. 3 depicts the operation of a specific electronic device 110, a specific RMC 120 and a specific power supply center 130 in the rack-mount system 100, and includes the following steps:

Step 310: the specific electronic device 110 sends a booting notification to the specific RMC 120 and performs the booting procedure when a predetermined period has elapsed after sending the booting notification.

Step 320: the specific RMC 120 accesses booting parameters of the specific electronic device 110 after receiving a booting notification.

Step 330: the specific RMC 120 calculates the amount of power required for the specific electronic device 110 to perform the booting procedure according to the booting parameters.

Step 340: the specific RMC 120 controls the number of activated power supplies in the specific power supply center 130 according to the amount of power required for the specific electronic device 110 to perform the booting procedure.

In the embodiment illustrated in FIG. 3, steps 320, 330 and 340 may be performed in the same manner as steps 220, 230 and 240 illustrated in FIG. 2, respectively. However, the embodiments illustrated in FIGS. 2 and 3 are different in the time when the specific electronic device 110 starts to perform the booting procedure. In the embodiment illustrated in FIG. 2, after sending the booting notification to the specific RMC 120 in step 210, the specific electronic device 110 is configured to perform the booting procedure only after having received the booting approval sent by the specific RMC 120 in step 250. In the embodiment illustrated in FIG. 3, after sending the booting notification to the specific RMC 120 in step 310, the specific electronic device 110 is configured to directly perform the booting procedure when a predetermined period has elapsed after sending the booting notification.

Figure 4:
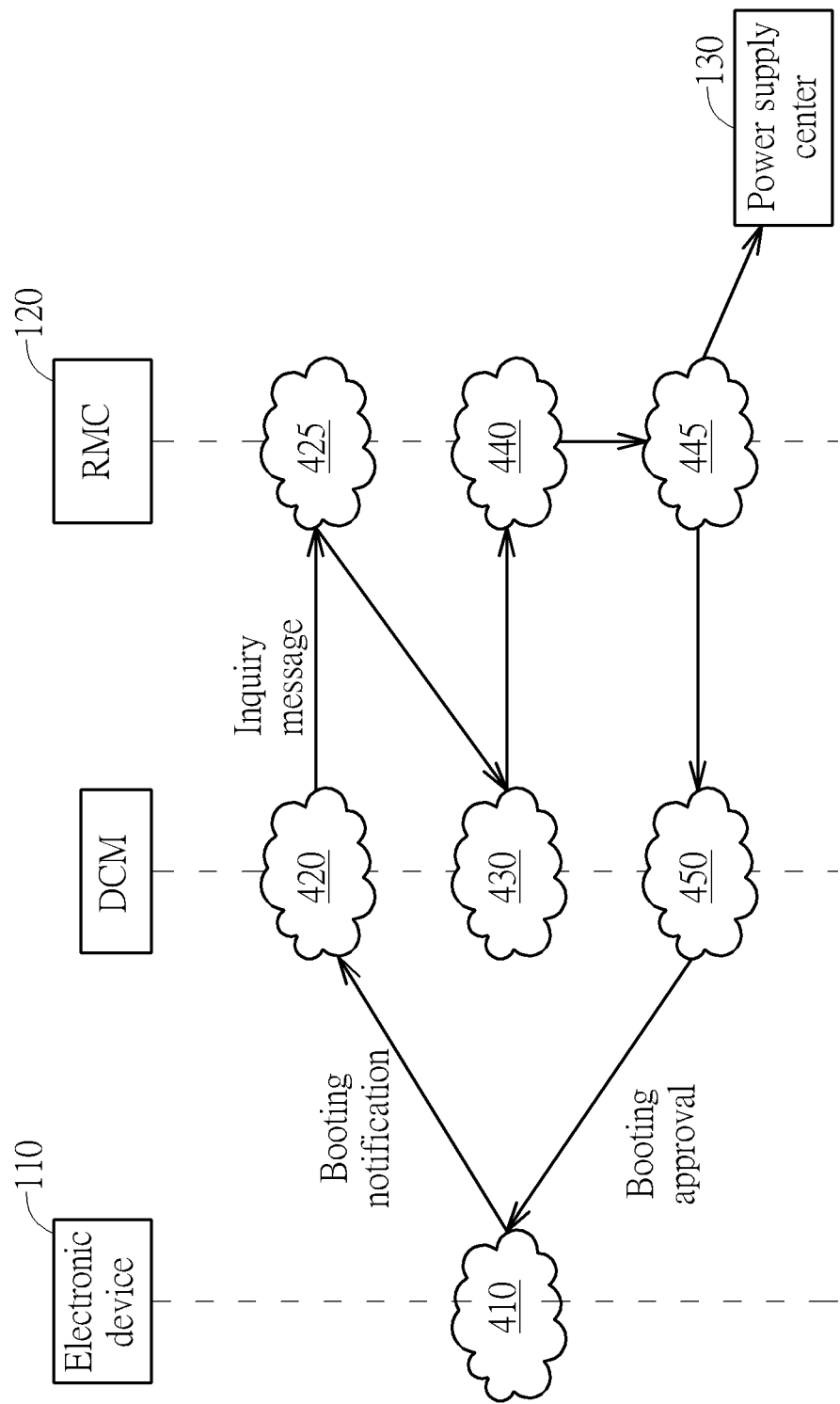
FIG. 4 is a diagram illustrating the operation of a rack-mount system according to another embodiment of the present application.

FIG. 4 is a diagram illustrating the operation of the rack-mount system 100 according to yet another embodiment of the present application. For illustrative purpose, FIG. 4 depicts the operation of a specific electronic device 110, a RMC 120, a specific power supply center 130 and the data center manager DCM in the rack-mount system 100, and includes the following steps:

Step 410: the specific electronic device 110 sends a booting notification to the data center manager DCM.

Step 420: the data center manager DCM sends an inquiry message to the specific RMC 120 after receiving the booting notification.

Step 425: the specific RMC 120 reports booting parameters of the specific electronic device 110 to the data center manager DCM after receiving the inquiry message.

Step 430: the data center manager DCM calculates the amount of power required for the specific electronic device 110 to perform the booting procedure according to the booting parameters and notifies the specific RMC 120 of the calculation result.

Step 440: the specific RMC 120 controls the number of activated power supplies in the specific power supply center 130 according to the amount of power required for the specific electronic device 110 to perform the booting procedure.

Step 445: the specific RMC 120 reports the operational status of the specific power supply center 130 to the data center manager DCM.

Step 450: the data center manager DCM determines whether the booting approval should be sent to the specific electronic device 110 according to the operational status of the specific power supply center 130.

In step 410, the specific electronic device 110 may send the booting notification before performing the booting procedure using a specific network communication standard, such as IPMI or SNMP. However, the method of sending the booting notification does not limit the scope of the present invention.

In step 420, the data center manager DCM may send the inquiry message to the specific RMC 120 after receiving the booting notification. In step 425, the specific RMC 120 may report booting parameters of the specific electronic device 110 to the data center manager DCM after receiving the inquiry message. More specifically, after receiving the inquiry message, the specific RMC 120 may retrieve the maximum power consumption of the specific electronic device 110 from the storage unit 124 and report the retrieved booting parameters to the data center manager DCM In step 430, the data center manager DCM may calculate the amount of power required for the specific electronic device 110 to perform the booting procedure according to the booting parameters and notify the specific RMC 120 of the calculation result. In step 440, the specific RMC 120 may control the number of activated power supplies in the specific power supply center 130 according to the amount of power required for the specific electronic device 110 to perform the booting procedure. Step 240 and step 440 may be executed in the same manner as previously illustrated.

In step 445, the specific RMC 120 may report the operational status of the specific power supply center 130 to the data center manager DCM. In step 450, the data center manager DCM may determine whether the booting approval should be sent to the specific electronic device 110 according to the operational status of the specific power supply center 130. If the specific power supply center 130 is able to provide all the amount of power required for the specific electronic device 110 to perform the booting procedure, the data center manager DCM may send the booting approval to the specific electronic device 110; if the specific power supply center 130 is unable to provide all the amount of power required for the specific electronic device 110 to perform the booting procedure, the data center manager DCM does not send the booting approval to the specific electronic device 110.

Figure 5:
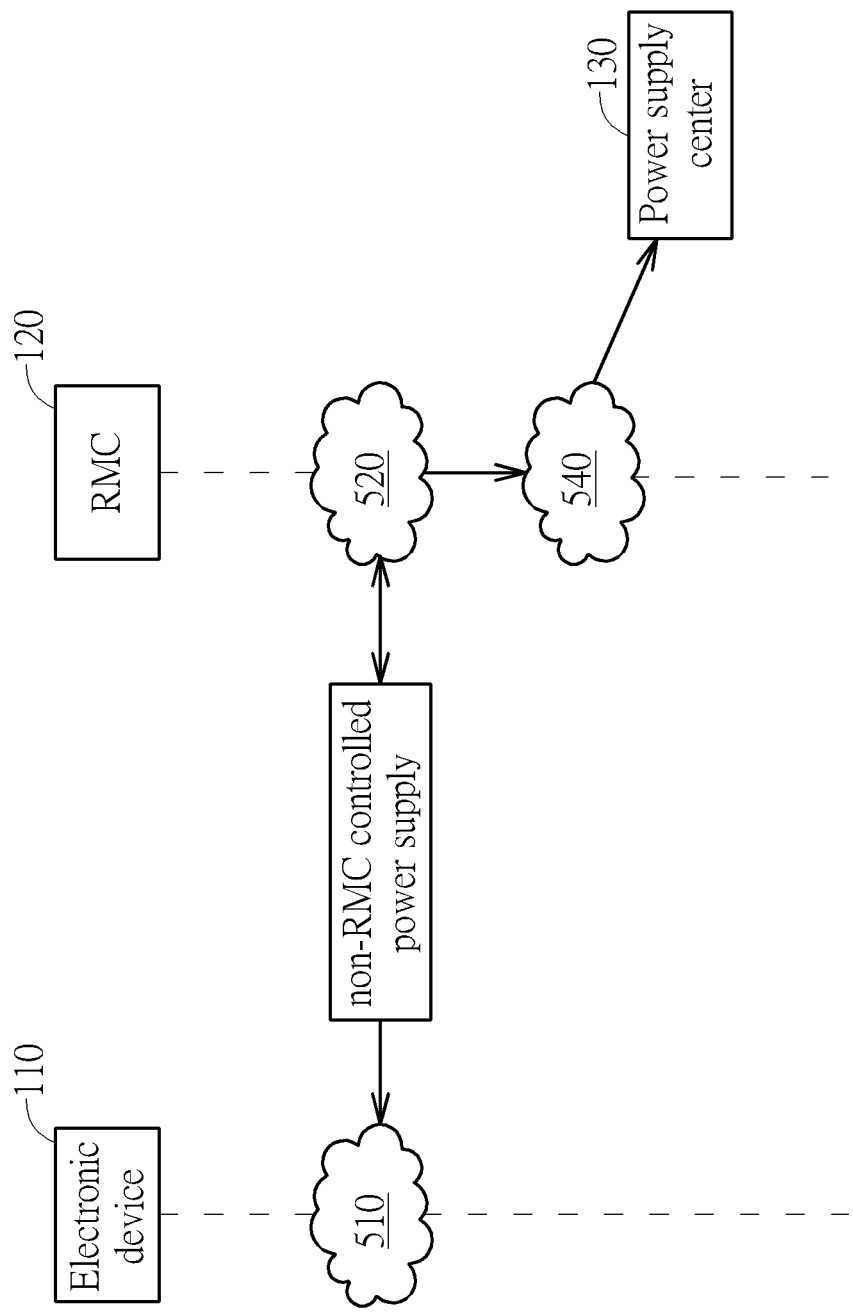
FIG. 5 is a diagram illustrating the operation of a rack-mount system according to another embodiment of the present application.

FIG. 5 is a diagram illustrating the operation of the rack-mount system 100 according to yet another embodiment of the present application. For illustrative purpose, FIG. 5 depicts the operation of a specific electronic device 110, a RMC 120, and a specific power supply center 130, and includes the following steps:

Step 510: supplying the specific electronic device 110 using the non-RMC controlled power supply PSU for performing the booting procedure.

Step 520: the specific RMC 120 monitors the operational status of the non-RMC controlled power supply PSU.

Step 530: the specific RMC 120 controls the number of activated power supplies in the specific power supply center 130 according to the operational status of the non-RMC controlled power supply PSU.

In step 510, the non-RMC controlled power supply PSU may be a built-in power supply of the specific electronic device 110, or a dedicated power supply disposed in a corresponding rack for the specific electronic device 110. The non-RMC controlled power supply PSU is configured to provide the amount of power required for the specific electronic device 110 to perform the booting procedure.

In step 520, the specific RMC 120 may monitor the operational status of the non-RMC controlled power supply PSU. For example, the non-RMC controlled power supply PSU may inform the specific RMC 120 of its current operational status by sending loading signals via signal pins.

In step 530, the specific RMC 120 may control the number of activated power supplies in the specific power supply center 130 according to the operational status of the non-RMC controlled power supply PSU.

In an embodiment, it is assumed that the non-RMC controlled power supply PSU operating in its optimized operational range is able to provide 900 W power, which is the amount of power required for the specific electronic device 110 to perform the booting procedure. Under such circumstance, the specific RMC 120 may determine in step 520 that the non-RMC controlled power supply PSU does not deviate from its optimized operational range, and no power supply in the specific power supply center 130 is further activated in step 530.

In another embodiment, it is assumed that the non-RMC controlled power supply PSU is able to provide a maximum power of 1000 W which is more than the amount of power (900 W) required for the specific electronic device 110 to perform the booting procedure, but the optimized operational range of the non-RMC controlled power supply PSU is 350 W-800 W. Under such circumstance, the specific RMC 120 may determine in step 520 that the non-RMC controlled power supply PSU would deviate from its optimized operational range in order to provide 900 W power and may thus activate one or multiple power supplies in the specific power supply center 130 capable of providing 100 W-550 W power in step 530. Therefore, the non-RMC controlled power supply PSU only needs to provide 350 W-800 W power, thereby capable to operating in its optimized operational range.

In yet another embodiment, it is assumed that the non-RMC controlled power supply PSU is able to provide a maximum power of 1000 W which is more than the amount of power (900 W) required for the specific electronic device 110 to perform the booting procedure, but the non-RMC controlled power supply PSU somehow breaks down. Under such circumstance, the specific RMC 120 may determine in step 520 that the non-RMC controlled power supply PSU is unable to function normally and may thus activate one or multiple power supplies in the specific power supply center 130, wherein the sum of maximum output power of all activated power supplies is equal to or larger than 900 W or the sum of output power of all activated power supplies when operating in respective optimized operational ranges is equal to or larger than 900 W.

Figure 6:
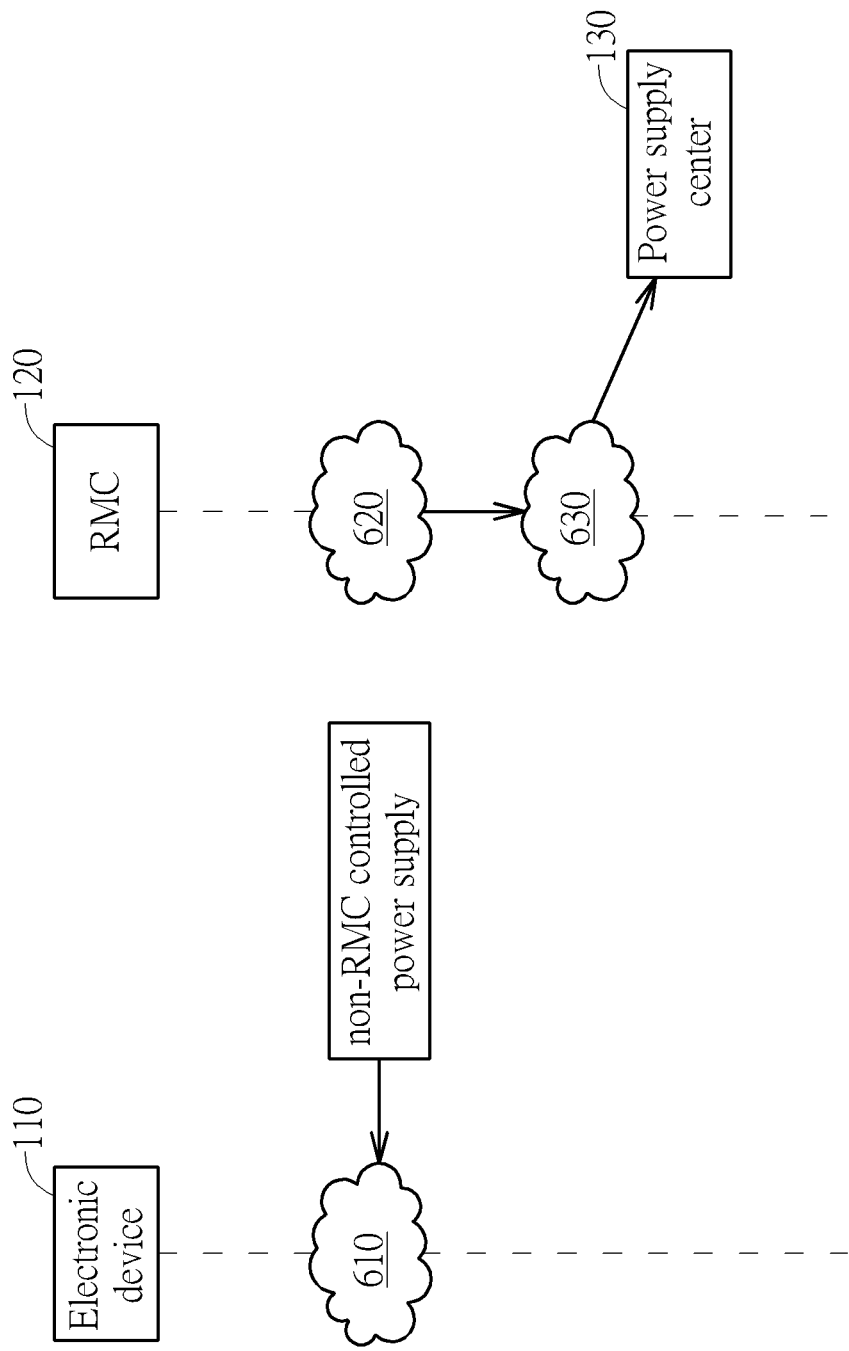
FIG. 6 is a diagram illustrating the operation of a rack-mount system according to another embodiment of the present application.

FIG. 6 is a diagram illustrating the operation of the rack-mount system 100 according to yet another embodiment of the present application. For illustrative purpose, FIG. 6 depicts the operation of a specific electronic device 110, a RMC 120, and a specific power supply center 130 disposed in a specific rack, and includes the following steps:

Step 610: supplying the specific electronic device 110 using the non-RMC controlled power supply PSU for performing the booting procedure.

Step 620: the specific RMC 120 monitors the electrical behavior of the specific rack and the operational status of the specific power supply center 130.

Step 530: the specific RMC 120 controls the number of activated power supplies in the specific power supply center 130 according to the monitored data of the electrical behavior of the specific rack and the operational status of the specific power supply center 130.

In step 610, the non-RMC controlled power supply PSU may be a built-in power supply of the specific electronic device 110, or a dedicated power supply disposed in a corresponding rack for the specific electronic device 110. The non-RMC controlled power supply PSU is configured to provide the amount of power required for the specific electronic device 110 to perform the booting procedure. The specific electronic device 110 is not required to inform the specific RMC 120 before performing the booting procedure.

In step 620, the specific RMC 120 may monitor the electrical behavior of the specific rack and the operational status of the specific power supply center 130. In step 630, the specific RMC 120 may control the number of activated power supplies in the specific power supply center 130 according to the monitored data acquired in step 630.

Surge current is a short-duration, high-amperage electric current wave which is generated when the specific electronic device 110 starts to perform the booting procedure and may cause sudden increase in power consumption. When the monitor unit 126 of the specific RMC 120 detects the voltage drop caused by the surge current, the logic unit 122 may calculate the power consumption of the surge current, based on which the management unit 128 may control the number of activated power supplies in the specific power supply center 130 in order to compensate the extra power consumption. Therefore, the specific rack may quickly return to a stable state after the specific electronic device 110 performs the booting procedure.

When the specific rack somehow consumes more power due to other operations (such as more electronic devices 110 have been activated), all activated power supplies in the specific power supply center 130 may deviate from respective optimized operational ranges due to the loading increase. When the monitor unit 126 of the specific RMC 120 detects such condition, the logic unit 122 may re-calculate the amount of power required for operating the specific rack, based on which the management unit 128 may control the number of activated power supplies in the specific power supply center 130 in order to compensate the loading variation. Therefore, all activated power supplies in the specific power supply center 130 may operate in respective optimized operational ranges.

It is to be noted that the method depicted in FIG. 6 may also be incorporated into the methods depicted in FIGS. 2-5. In an embodiment, the present invention may execute steps 620-630 after finishing steps 210-250 in order to ensure that all activated power supplies in the specific power supply center 130 can operate in respective optimized operational ranges. In another embodiment, the present invention may execute steps 620-630 after finishing steps 310-340 in order to ensure that all activated power supplies in the specific power supply center 130 can operate in respective optimized operational ranges. In yet another embodiment, the present invention may execute steps 620-630 after finishing steps 410-450 in order to ensure that all activated power supplies in the specific power supply center 130 can operate in respective optimized operational ranges. In yet another embodiment, the present invention may execute steps 620-630 after finishing steps 510-550 in order to ensure that all activated power supplies in the specific power supply center 130 can operate in respective optimized operational ranges.

The present invention provides a method of performing power management in a rack-mount system. The data center manager or the rack management controller is configured to calculate the amount of power required for the specific electronic device to perform the booting procedure. The rack management controller is configured to control the number of activated power supplies among the plurality of power supplies according to the calculated amount of power, thereby improving power efficiency. Also, the RMC according to the present invention can monitor the electrical behavior of a corresponding rack and the operational status of a corresponding power supply center, thereby controlling the number of activated power supplies in the corresponding power supply center accordingly. Therefore, the rack-mount system can remain in a stable state and all activated power supplies in the power supply center may operate in respective optimized operational ranges.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing power management in a rack-mount system, the rack-mount system including a plurality of electronic devices and a plurality of power supplies disposed in a rack, the method comprising:
   a specific electronic device among the plurality of electronic devices sending a booting notification to a rack management controller (RMC) of the rack-mount system before performing a booting procedure; and
   the RMC accessing booting parameters of the specific electronic device after receiving the booting notification;
   the RMC calculating an amount of power required for the specific electronic device to perform the booting procedure according to the booting parameters;
   the RMC controlling a number of activated power supplies among the plurality of power supplies according to the calculated amount of power required for the specific electronic device to perform the booting procedure;
   the RMC sending a booting approval after controlling the number of activated power supplies among the plurality of power supplies; and
   the specific electronic device performing the booting procedure after receiving the booting approval.

2. The method of claim 1, further comprising:
   the RMC monitoring an electronic behavior of the rack and an operational status of the plurality of power supplies after controlling the number of activated power supplies among the plurality of power supplies; and
   the RMC adjusting the number of activated power supplies among the plurality of power supplies according to the monitored electronic behavior and the operational status.

3. The method of claim 1, wherein:
   controlling the number of activated power supplies among the plurality of power supplies according to the calculated amount of power required for the specific electronic device to perform the booting procedure is activating one or multiple power supplies among the plurality of power supplies; and
   a sum of maximum output power of the activated one or multiple power supplies is equal to or larger than the amount of power required for the specific electronic device to perform the booting procedure.

4. The method of claim 1, wherein:
   controlling the number of activated power supplies among the plurality of power supplies according to the calculated amount of power required for the specific electronic device to perform the booting procedure is activating one or multiple power supplies among the plurality of power supplies; and
   a sum of output power of the activated one or multiple power supplies when operating in respective optimized operational ranges is equal to or larger than the amount of power required for the specific electronic device to perform the booting procedure.

5. A method of performing power management in a rack-mount system, the rack-mount system including a plurality of electronic devices and a plurality of power supplies disposed in a rack, the method further comprising:
   a specific electronic device among the plurality of electronic devices sending a booting notification to a rack management controller (RMC) of the rack-mount system before performing a booting procedure;

accessing booting parameters of the specific electronic device before the specific electronic device performs the booting procedure;

calculating an amount of power required for the specific electronic device to perform the booting procedure according to the accessed boot parameters;

controlling a number of activated power supplies among the plurality of power supplies according to the calculated amount of power required for the specific electronic device to perform the booting procedure; and the specific electronic device performing the booting procedure when a predetermined period has elapsed after sending the booting notification.

6. A method of performing power management in a rack-mount system, the rack-mount system including a plurality of electronic devices and a plurality of power supplies disposed in a rack, the method comprising:

a specific electronic device among the plurality of electronic devices sending a booting notification to a data center manager (DCM) of the rack-mount system before performing the booting procedure;

the DCM sending an inquiry message to a rack management controller (RMC) of the rack-mount system after receiving the booting notification;

the RMC sending the booting parameters of the specific electronic device to the DCM after receiving the inquiry message;

the DCM calculating the amount of power required for the specific electronic device to perform the booting procedure according to the booting parameters of the specific electronic device and notifying the RMC of the calculated amount of power required for the specific electronic device to perform the booting procedure; and the RMC controlling the number of activated power supplies among the plurality of power supplies according to the amount of power required for the specific electronic device to perform the booting procedure and notifying the DCM of a status of the plurality of power supplies;

the DCM determining whether a booting approval should be sent to the specific electronic device according to the status of the plurality of power supplies; and the specific electronic device performing the booting procedure when receiving the booting approval.

7. A method of performing power management in a rack-mount system, the rack-mount system including a plurality of electronic devices and a plurality of power supplies disposed in a rack, the method further comprising:

a specific electronic device among the plurality of electronic devices sending a booting notification to a rack management controller (RMC) of the rack-mount system or to a data center manager (DCM) of the rack-mount system using an intelligent platform management interface (IPMI) via a baseboard management controller (BMC) before performing the booting procedure, or sending the booting notification to the RMC or to the DCM using a simple network management protocol (SNMP) via a network management software module before performing a booting procedure;

accessing booting parameters of the specific electronic device before the specific electronic device performs the booting procedure;

calculating an amount of power required for the specific electronic device to perform the booting procedure according to the accessed boot parameters;

controlling a number of activated power supplies among the plurality of power supplies according to the calculated amount of power required for the specific electronic device to perform the booting procedure.

8. A method of performing power management in a rack-mount system, the rack-mount system including a plurality of electronic devices, a plurality of power supplies, a rack management controller (RMC), and at least one non-RMC controlled power supply disposed in a rack, the method comprising:

a specific electronic device among the plurality of electronic devices performs a booting procedure using power supplied by the non-RMC controlled power supply;

the RMC monitoring a status of the at least one non-RMC controlled power supply; and the RMC controlling a number of activated power supplies among the plurality of power supplies according to the status of the at least one non-RMC controlled power supply.

9. The method of claim 8, wherein:

the RMC controlling the number of activated power supplies among the plurality of power supplies according to the status of the at least one non-RMC controlled power supply is activating one or multiple power supplies among the plurality of power supplies so as to allow the at least one non-RMC controlled power supply to operate in an optimized operational range.

10. The method of claim 9, further comprising:

the RMC monitoring an electronic behavior of the rack and an operational status of the plurality of power supplies after controlling the number of activated power supplies among the plurality of power supplies; and the RMC adjusting the number of activated power supplies among the plurality of power supplies according to the monitored electronic behavior and the operational status.

11. A method of performing power management in a rack-mount system, the rack-mount system including a plurality of electronic devices, a plurality of power supplies, at least one non-RMC controlled power supply, and a rack management controller (RMC) disposed in a rack, the method comprising:

the RMC monitoring an electronic behavior of the rack and an operational status of the plurality of power supplies;

the RMC controlling a number of activated power supplies among the plurality of power supplies according to the monitored electronic behavior and the operational status; and a specific electronic device among the plurality of electronic devices performing a booting procedure using power supplied by the at least one non-RMC controlled power supply.

12. The method of claim 11, wherein the RMC monitoring the electronic behavior of the rack is by monitoring surge current generated by the specific electronic device when performing the booting procedure.

13. The method of claim 11, wherein:

the RMC controlling the number of activated power supplies among the plurality of power supplies according to the monitored electronic behavior and the operational status is activating one or multiple power supplies among the plurality of power supplies so as to allow the at least one non-RMC controlled power supply to operate in an optimized operational range.

14. The method of claim 11, wherein each activated power supply among the plurality of power supplies operates in an optimized operational range.

* * * * *